United States Patent Office 3,094,518
Patented June 18, 1963

3,094,518
NOVEL CARBAMYL-AZETIDINE COMPOUNDS
Emilio Testa, Vacallo, Ticino, Switzerland, and Luigi Fontanella and Giulio Maffii, Milan, Italy, assignors to Lepetit S.p.A., Milan, Italy
No Drawing. Filed Dec. 18, 1959, Ser. No. 860,312
Claims priority, application Great Britain Dec. 23, 1958
6 Claims. (Cl. 260—239)

This invention is concerned with new pharmacologically active compounds. More particularly, the invention is concerned with new carbamylazetidines of the formula

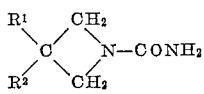

wherein $R^1$ represents hydrogen, lower alkyl, cycloalkyl, phenyl and phenylalkyl radicals, and $R^2$ represents lower alkyl, cycloalkyl, phenyl and phenylalkyl radicals.

The compounds of the invention are active as sedative, hypnotic and antispasmodic agents. This last effect is particularly high with 1-carbamyl-3-phenyl-3-propylazetidine, 1-carbamyl-3-phenyl-3-isopropylazetidine and 1-carbamyl-3-phenyl-3-methylazetidine, which already in doses lower than 20 mg./kg. prevent convulsive seizures induced by pentamimethylenetetrazole. The average lethal dose $LD_{50}$ is very high, in all cases exceeding 300–400 mg./kg. on intraperitoneal administration to rats.

The process for the preparation of the new compounds consists in reacting for some minutes the hydrochloride of a 3-substituted azetidine of the formula

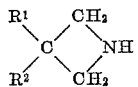

wherein $R^1$ and $R^2$ have the above significance, with an equimolecular amount of an alkali metal cyanate in water at 50–100° C. After cooling generally an oil separates, which after some time crystallizes. The product is collected and if desired recrystallized from a suitable solvent. Yields are generally very satisfactory.

The starting compounds i.e. the 3-substituted azetidines, are prepared according to the procedures described in E. Testa and Fontanella, Liebigs Ann. Chem. 625, 95–98 (1959); E. Testa and Fontanella, Liebigs Ann. Chem. 614, 167–170 (1958); E. Testa, Fontanella and Fava, Farmaco 13, 152–162 (1958); and Fontanella and Testa, Liebigs Ann. Chem. 622, 117–120 (1959).

The following examples are illustrative of the invention.

Example 1

A suspension of 32 g. of 3-phenyl-3-ethylazetidine in 100 ml. water is treated first with 100 ml. of 2 N hydrochloric acid, and then with 13 g. of sodium cyanate. The mixture is then heated 15 minutes to 50–60° C. An oil gradually separates, which after cooling crystallizes. The product is collected and recrystallized from 5 percent ethanol. Yield 36 g. (88%) of 1-carbamyl-3-phenyl-3-ethylazetidine; M.P. 154–156° C.

Example 2

A solution of 18.35 g. of 3-phenyl-3-methylazetidine hydrochloride in 100 ml. of water is heated to 50–60° C. for 15 minutes with 6.5 g. of sodium cyanate. The product which separates as an oil, solidifies on cooling and is collected. Yield 17 g. (90%) of 1-carbamyl-3-phenyl-3-methylazetidine; M.P. 176° C. (from dilute ethanol).

Example 3

A solution of 17 g. of 3-phenylazetidine hydrochloride in 100 ml. water is heated 10 minutes to 60–65° C. with 6.5 g. of sodium cyanate. After cooling the product is collected and recrystallized from ethanol. Yield 14 g. (80%) of 1-carbamyl-3-phenylazetidine; M.P. 231–233° C.

Example 4

A solution of 15 g. of 3,3-diethylazetidine in 100 ml. of water is heated 20 minutes to 55–60° C. with 6.5 g. of sodium cyanate. After cooling the formed precipitate is collected and recrystallized from dilute ethanol. Yield 12 g. (77%) of 1-carbamyl-3,3-diethylazetidine; M.P. 179–180° C.

Example 5

A suspension of 21.2 g. of 3-phenyl-3-propylazetidine in 100 ml. of water is heated with 5.6 g. of sodium cyanate for 15 minutes to 50–60° C. After cooling the formed product is collected and recrystallized from dilute ethanol. Yield 19 g. (87%) of 1-carbamyl-3-phenyl-3-propylazetidine; M.P. 165–166° C.

Examples 6 to 10

According to the process of the preceding examples the following 1-carbamylazetidines were produced from the corresponding azetidines. Yields (y.) and melting points (M.P.) are given:

| | M.P., ° C. |
|---|---|
| 3-phenyl-3-benzyl (y. 81%) | 159–161 |
| 3,3-dibutyl (y. 90%) | 114–115 |
| 3-phenyl-3-butyl (y. 75%) | 129–131 |
| 3-phenyl-3-isopropyl (y. 86%) | 158–160 |
| 3-phenyl-3-cyclohexyl (y. 62%) | 172–174 |

We claim:
1. A compound of the formula

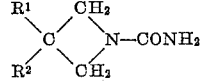

wherein $R^1$ is a member of the class consisting of hydrogen, lower alkyl, cyclohexyl, and benzyl, while $R^2$ is a member of the class consisting of lower alkyl and phenyl, $R^2$ being only phenyl when $R^1$ is hydrogen.
2. 1-carbamyl-3-phenyl-3-ethylazetidine.
3. 1-carbamyl-3-phenyl-3-methylazetidine.
4. 1-carbamyl-3-phenylazetidine.
5. 1-carbamyl-3-phenyl-propylazetidine.
6. 1-carbamyl-3-phenyl-3-isopropylazetidine.

References Cited in the file of this patent

Howard et al., Berichte, volume 32, page 2034 (1899).
Mannich et al., Berichte, volume 70, pages 210–213 (1937).